United States Patent
Ma

(10) Patent No.: US 10,828,731 B2
(45) Date of Patent: Nov. 10, 2020

(54) PB-FREE SOLDER ALLOY

(71) Applicant: Jusheng Ma, Beijing (CN)

(72) Inventor: Jusheng Ma, Beijing (CN)

(*) Notice: Subject to any disclaimer, the term of this patent is extended or adjusted under 35 U.S.C. 154(b) by 0 days.

(21) Appl. No.: 14/760,822

(22) PCT Filed: Jan. 21, 2014

(86) PCT No.: PCT/CN2014/071032
§ 371 (c)(1),
(2) Date: Jul. 14, 2015

(87) PCT Pub. No.: WO2014/114225
PCT Pub. Date: Jul. 31, 2014

(65) Prior Publication Data
US 2015/0343570 A1    Dec. 3, 2015

(30) Foreign Application Priority Data
Jan. 22, 2013  (CN) .......................... 2013 1 0025378

(51) Int. Cl.
C22C 13/00     (2006.01)
B23K 35/26     (2006.01)
B23K 35/24     (2006.01)
B23K 35/02     (2006.01)

(52) U.S. Cl.
CPC .......... B23K 35/262 (2013.01); B23K 35/025 (2013.01); B23K 35/0222 (2013.01); B23K 35/0227 (2013.01); B23K 35/0244 (2013.01); B23K 35/24 (2013.01); B23K 35/26 (2013.01); C22C 13/00 (2013.01)

(58) Field of Classification Search
CPC ........ B23K 35/26; B23K 35/262; C22C 13/00
See application file for complete search history.

(56) References Cited

U.S. PATENT DOCUMENTS

2007/0228109 A1*  10/2007  Smith .................. B23K 35/262
                                                            228/176
2008/0159904 A1*   7/2008  Lewis ..................... C22C 13/00
                                                            420/561
2008/0292492 A1   11/2008  Ingham et al.

FOREIGN PATENT DOCUMENTS

| CN | 1621195 A | 6/2005 |
| CN | 1718796 A | 1/2006 |
| CN | 101096730 A | 1/2008 |
| CN | 101132881 A | 2/2008 |
| CN | 103042315 A | 4/2013 |
| JP | 2000015478 A | 1/2000 |
| JP | 2005103562 A | 4/2005 |
| JP | 2006255762 A * | 9/2006 |
| JP | 2009502512 A * | 1/2009 |
| JP | 2011005510 * | 1/2011 |

OTHER PUBLICATIONS

JP-2006255762-A computer english translation (Year: 2006).*
European Patent Office, Search report for EP application14743284.
Korean Patent Office, Office action for KR application20157021605.
China Patent Office, Office action for CN application201310025378.2.

* cited by examiner

*Primary Examiner* — Erin B Saad
(74) *Attorney, Agent, or Firm* — Hodgson Russ LLP

(57) ABSTRACT

A Pb-free solder alloy contains 4-12 wt% of Zn, 0.5-4 wt% of Bi, 0.5-5 wt% of In, 0.005-0.5 wt% of P, 0.001-0.5 wt% of Zr and at least one selected from: 0-0.1 wt% of Y, 0-0.2 wt% of Ge, 0-0.05 wt% of Mg, 0-0.02 wt% of B, 0-0.05 wt% of Al, 0-0.2 wt% of Ni and 0-0.3 wt% of Ag. A balance of the Pb-free solder alloy is Sn.

2 Claims, No Drawings

PB-FREE SOLDER ALLOY

CROSS REFERENCE TO RELATED APPLICATION

This U.S. application claims priority under 35 U.S.C 371 to, and is a U.S. National Phase application of, the International Patent Application No. PCT/CN2014/071032, filed Jan. 21, 2014, which claims the benefit of prior Chinese Application No. 201310025378.2 filed Jan. 22, 2013. The entire contents of the before-mentioned patent applications are incorporated by reference as part of the disclosure of this U.S. application.

FIELD

Embodiments of the present disclosure generally relate to the soldering field, more particularly, to a Pb-free solder alloy and a method for preparing the same.

BACKGROUND

In the electronic industry, normally Sn-Pb eutectic alloys having a melting point of 183° C. are applied as the main soldering material, which play an important role in the assembly of electronic components. However, Pb and Pb compounds are both toxic, which are possible to pollute the environment and to harm the health of users.

Sn-Ag-Cu alloys are also applied as soldering materials. Except for the drawbacks of poor wetting performance, large volume, ununiform distribution and poor stability, the Sn-Ag-Cu alloy has a melting temperature which is as high as 221° C., so that related production devices need to be modified. Therefore, the manufacturing cost for the Sn-Ag-Cu alloy is increased. In addition, due to the high melting temperature of the Sn-Ag-Cu alloy, during the assembly of the electronic components, the highest temperature required by a Sn-Ag-Cu alloy process is about 40-50° C. higher than that required by a Sn-Pb process. In this condition, the assembly time is longer, and energy consumption of the assembly process is increased up to by 25%. Moreover, more $CO_2$ generates during the assembly process, which is the main cause of the greenhouse effect and bad for the environment. Therefore, it is needed to provide a soldering alloy, in which the above mentioned problems can be solved.

SUMMARY

Embodiments of the present disclosure seek to solve at least one of the problems existing in the prior art to at least some extent, or to provide a consumer with a useful commercial choice.

Embodiments of an aspect of the present disclosure provide a Pb-free solder alloy. The Pb-free solder alloy may contain: 4-12 wt % of Zn, 0.5-4 wt % of Bi, 0.5-5 wt % of In, 0.005-0.5 wt % of P, 0.001-0.5 wt % of Zr, at least one selected from a group consisting of: 0-0.1 wt % of Y, 0-0.2 wt % of Ge, 0-0.05 wt % of Mg, 0-0.02 wt % of B, 0-0.05 wt % of Al, 0-0.2 wt % of Ni and 0-0.3 wt % of Ag, and a balance of Sn.

The Pb-free solder alloy according to embodiments of the present disclosure may have both low melting temperature and high stability. With the presence of P and Zr, the melting temperature of the Pb-free solder alloy may be reduced, for example, be reduced to a temperature close to a melting point of the Sn-Pb eutectic alloy, i.e., 183° C. In addition, the presence of Zr may facilitate to refine the crystalline structure of the Pb-free solder alloy, and bulky dendritic crystalline structures in the Pb-free solder alloy may be reduced. Therefore, the intensity and toughness of the grain boundary of the Pb-free solder alloy may be strengthened, and $\sigma_{0.2}$ of the Pb-free solder alloy may also be increased. In this way, the stress concentration and deformation may be reduced or even avoided. Therefore, cracks may be difficult to spread in the Pb-free solder alloy, and the soldering performances of the Pb-free solder alloy may be improved. Further, the Pb-free solder alloy according to embodiments of the present disclosure may have improved stability.

With the presence of the at least one element selected from a group consisting of: 0-0.1 wt % of Y, 0-0.2 wt % of Ge, 0-0.05 wt % of Mg, 0-0.02 wt % of B, 0-0.05 wt % of Al, 0-0.2 wt % of Ni and 0-0.3 wt % of Ag, the grain boundary of the Pb-free solder alloy may be modified, thus the stability of the Pb-free solder alloy may be further improved, for example, the Pb-free solder alloy may have better heat resistance and humidity resistance. The Pb-free solder alloy may have a smaller wetting angle θ, that is to say, the Pb-free solder alloy has a good wetting performances on a soldering part. In addition, the oxidation resistance of the Pb-free solder alloy may be improved. Therefore, it is easy to form an oxidation film on the Pb-free solder alloy, thus protecting the Pb-free solder alloy from being damaged. The film may be removed during the soldering process by using a solvent. In this way, the Pb-free solder alloy may have more uniform structure and less defects, and a better adhesion may be formed by using the Pb-free solder alloy. Therefore, soldering performances of the Pb-free solder alloy according to embodiments of the present disclosure may be further improved.

The Pb-free solder alloy according to embodiments of the present disclosure may be processed into various forms, such as rod, wire, powder, paste, etc. Therefore the Pb-free solder alloy can be applied in various soldering processes and various requirements in the soldering process can be satisfied by using the Pb-free solder alloy.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

For the purpose of the present description and of the following claims, the definitions of the numerical ranges always include the extremes unless otherwise specified.

It should be noted that, when referring to weight content (wt %) in the present disclosure, the weight content may always be based on the total weight of the Pb-free solder alloy.

Embodiments of an aspect of the present disclosure provide a plumbum-free (Pb-free) solder alloy. The Pb-free solder alloy may contain: 4-12 wt % of zinc (Zn), 0.5-4 wt % of (bismuth) Bi, 0.5-5 wt % of indium (In), 0.005-0.5 wt % of phosphor (P), 0.001-0.5 wt % of zirconium (Zr), at least one selected from a group consisting of: 0-0.1 wt % of yttrium (Y), 0-0.2 wt % of germanium (Ge), 0-0.05 wt % of magnesium (Mg), 0-0.02 wt % of boron (B), 0-0.05 wt % of aluminum (Al), 0-0.2 wt % of nickel (Ni) and 0-0.3 wt % of silver (Ag), and a balance of stannum (Sn).

The Pb-free solder alloy according to embodiments of the present disclosure may have both low melting temperature and high stability. The inventors found that, with the presence of P and Zr, the melting temperature of the Pb-free solder alloy may be reduced, for example, be reduced to a temperature close to a melting point of the Sn-Pb eutectic alloy, i.e., 183° C.

The inventors also found that, with the presence of Zr, the stability of the Pb-free solder alloy may be enhanced and the soldering performances of the Pb-free solder alloy may be improved. On the one hand, Zr atom may adhere on the grain boundary of the Pb-free solder alloy due to its large atomic radius. On the other hand, Zr atom may generate a material point of ZrN on the grain boundary, which prevents cracks from spreading through the Pb-free solder alloy. In addition, as ZrN may act as a well for hydrogen (H), it may facilitate to refine the crystalline structure of the Pb-free solder alloy, and bulky dendritic crystalline structures in the Pb-free solder alloy may be reduced. Therefore, the intensity and toughness of the grain boundary of the Pb-free solder alloy may be strengthened, and $\sigma_{0.2}$ of the Pb-free solder alloy may also be increased. In this way, the stress concentration and deformation may be reduced or even avoided. Therefore, cracks may be difficult to spread in the Pb-free solder alloy, and the soldering performances of the Pb-free solder alloy may be improved.

Further, as Zr also has a strong adhesion with oxygen (O), a material point of ZrO may be formed on a surface of the Pb-free solder alloy. A P compound may also be formed on the surface of the Pb-free solder alloy. With the material point of ZrO and the P compound formed on the surface of the Pb-free solder alloy, grains on the Pb-free solder alloy may have refined diameters. In addition, the material point of ZrO and the P compound may prevent the Pb-free solder alloy from being damaged, thus wear resistance and corrosion resistance of the Pb-free solder alloy may be improved.

The Pb-free solder alloy according to embodiments of the present disclosure may have further improved stability and soldering performances, for example, reduced wetting angle and improved cracking resistance. The inventors found that, the at least one element selected from the group consisting of: 0-0.1 wt % of Y, 0-0.2 wt % of Ge, 0-0.05 wt % of Mg, 0-0.02 wt % of B, 0-0.05 wt % of Al, 0-0.2 wt % of Ni and 0-0.3 wt % of Ag may interact with the Zr and P in the Pb-free solder alloy.

In an embodiment, the Pb-free solder alloy may further contain Ge and Y. The inventors found that, Ge and Y may be oxidized to form Ge compound or Y compound on the surface of the Pb-free solder alloy, thus protecting welding spots during the soldering process. Therefore, the Pb-free solder alloy may have improved soldering performances.

In an embodiment, the Pb-free solder alloy may further contain Mg and Y. The inventors found that, Mg, Y and Zr may be oxidized during the soldering process, and impurities such as sulfur (S) may be fixed in the Pb-free solder alloy. Therefore, the Pb-free solder alloy may have improved soldering performances.

In an embodiment, the Pb-free solder alloy may further contain Y, B and Mg. The inventors found that, the interactions between Y, B, Mg and Zr may enhance strength of the soldering spot. As B having very small atom radius, the stress generated in the grains of the Pb-free solder alloy may be softened. In addition, B may be oxidized to form an oxidation film on the surface of the Pb-free solder alloy, thus protecting the Pb-free solder alloy from being damaged. Therefore, the Pb-free solder alloy may have improved soldering performances.

In an embodiment, the Pb-free solder alloy may further contain Al. The inventors found that, Al may also form an Al compound on the surface of the Pb-free solder alloy, thus protecting the Pb-free solder alloy. As Al has a face-centred cubic structure and is isotropic, when the Pb-free solder alloy is solidified, Al may be separated out and distributed in the Pb-free solder alloy in the form of tiny material point having high diffusion concentration. The tiny material point may provide oxidation resistances for the Pb-free solder alloy. In this way, oxidation resistance of the Pb-free solder alloy may be significantly improved by using a small quantity of Al. Therefore, the Pb-free solder alloy may have improved soldering performances.

In an embodiment, the Pb-free solder alloy may further contain Ni and Al. The inventors found that, the Pb-free solder alloy may have better stability and strength. Al and Ni may form nano-scale intermetallic compounds on the surface of the Pb-free solder alloy, so that stability of the Pb-free solder alloy may be improved. When soldering with a copper (Cu) substrate, a Cu compound may form on the interface between the Cu substrate and the Pb-free solder alloy, so that the adhesion between Cu substrate and the Pb-free solder alloy may be strengthened. Therefore, the Pb-free solder alloy may have improved soldering performances.

In an embodiment, the Pb-free solder alloy may further contain Ag. With the addition of Ag, the adhesion between Cu substrate and the Pb-free solder alloy may be further strengthened. Therefore, the Pb-free solder alloy may have improved soldering performances.

The Pb-free solder alloy according to embodiments of the present disclosure may be prepared by a method including the steps of: materials containing corresponding elements of the Pb-free solder alloy are provided, and the materials are provided according to weight contents of corresponding elements, and the materials are melted and cast to form the Pb-free solder alloy.

The melting step may be carried out by any conventional method. By way of example and without limits, the melting step may be performed in vacuum or in the presence of an inert gas. The inert gas is known to those having ordinary skill in the art, such as argon. With the presence of the inert gas, impurities (such as nitrogen or oxygen) may have less opportunity to enter into the final Pb-free solder alloy. Therefore, the Pb-free solder alloy prepared by the method described above may have better soldering performances.

Details of embodiments of the present disclosure may be explained in details with the following examples.

EXAMPLE 1

The Pb-free solder alloy E1 having compositions shown in the Table 1 was prepared by the steps of: a first mixture having the identified compositions was provided, and the first mixture was melted and cast.

EXAMPLE 2

The Pb-free solder alloy E2 having compositions shown in the Table 1 was prepared by the steps of: a second mixture having the identified compositions was provided, and the second mixture was melted and cast.

EXAMPLE 3

The Pb-free solder alloy E3 having compositions shown in the Table 1 was prepared by the steps of: a third mixture having the identified compositions was provided, and the third mixture was melted and cast.

EXAMPLE 4

The Pb-free solder alloy E4 having compositions shown in the Table 1 was prepared by the steps of: a fourth mixture having the identified compositions was provided, and the fourth mixture was melted and cast.

EXAMPLE 5

The Pb-free solder alloy E5 having compositions shown in the Table 1 was prepared by the steps of: a fifth mixture having the identified compositions was provided, and the fifth mixture was melted and cast.

EXAMPLE 6

The Pb-free solder alloy E6 having compositions shown in the Table 1 was prepared by the steps of: a sixth mixture having the identified compositions was provided, and the sixth mixture was melted and cast.

EXAMPLE 7

The Pb-free solder alloy E7 having compositions shown in the Table 1 was prepared by the steps of: a seventh mixture having the identified compositions was provided, and the seventh mixture was melted and cast.

EXAMPLE 8

The Pb-free solder alloy E8 having compositions shown in the Table 1 was prepared by the steps of: an eighth mixture having the identified compositions was provided, and the eighth mixture was melted and cast.

EXAMPLE 9

The Pb-free solder alloy E9 having compositions shown in the Table 1 was prepared by the steps of: a ninth mixture having the identified compositions was provided, and the ninth mixture was melted and cast.

EXAMPLE 10

The Pb-free solder alloy E10 having compositions shown in the Table 1 was prepared by the steps of: a tenth mixture having the identified compositions was provided, and the tenth mixture was melted and cast.

COMPARATIVE EXAMPLE 1

The Pb-free solder alloy CE1 having compositions shown in the Table 1 was provided.

COMPARATIVE EXAMPLE 2

The Pb-free solder alloy CE2 having compositions shown in the Table 1 was provided.

Tests

Wetting Angle

The Pb-free solder alloys E1-E10 and CE1-CE2 were tested with a wettability test. The wetting angles θ of all of the Pb-free solder alloys are shown in Table 2.

Stability

Each of the Pb-free solder alloys E1-E10 and CE1-CE2 was heated for 2000 hours under 85% RH at a temperature of 85° C. The Crack length on the surface of the soldering spot of each of the Pb-free solder alloys E1-E10 and CE1-CE2 was recorded. The results are shown in Table 2.

Melting Point

Melting points of the Pb-free solder alloys E1, E6, E8 and E9 were tested, and the results are 196° C., 192° C., 192° C. and 190.5° C. respectively.

TABLE 1

| | Zn (wt %) | Bi (wt %) | In (wt %) | P (wt %) | Zr (wt %) | B (wt %) | Mg (wt %) | Y (wt %) | Ni (wt %) | Al (wt %) | Ge (wt %) | Ag (wt %) | Sn (wt %) |
|---|---|---|---|---|---|---|---|---|---|---|---|---|---|
| E1 | 10 | 2.5 | 1.5 | 0.5 | 0.001 | / | / | / | / | / | / | / | balance |
| E2 | 12 | 0.5 | 5 | 0.21 | 0.1 | 0.02 | / | / | / | / | / | / | balance |
| E3 | 8 | 4 | 0.5 | 0.1 | 0.25 | / | 0.02 | / | / | / | / | / | balance |
| E4 | 4 | 3 | 2.5 | 0.005 | 0.5 | / | 0.05 | 0.01 | / | / | / | / | balance |
| E5 | 7.6 | 2 | 1.5 | 0.06 | 0.16 | / | / | / | 0.05 | 0.05 | / | / | balance |
| E6 | 8.25 | 1.43 | 1.2 | 0.3 | 0.16 | / | / | 0.1 | / | / | / | / | balance |
| E7 | 8.21 | 1.5 | 1.5 | 0.048 | 0.2 | / | / | / | / | / | 0.2 | / | balance |
| E8 | 7.7 | 1.4 | 1.5 | 0.5 | 0.2 | / | / | / | 0.2 | / | 0.01 | / | balance |
| E9 | 7.6 | 2.4 | 1.2 | 0.05 | 0.16 | / | / | / | 0.05 | 0.015 | / | / | balance |
| E10 | 7.8 | 2.4 | 1.3 | 0.04 | 0.16 | / | / | / | 0.02 | 0.002 | / | 0.3 | balance |
| CE1 | 8 | 3 | / | / | / | / | / | / | / | / | / | / | balance |
| CE2 | 9.1 | 2.5 | 1.5 | 0.015 | / | / | / | / | / | / | / | / | balance |

TABLE 2

| | θ (°) | Crack Length (μm) |
|---|---|---|
| E1 | 32 | 174 |
| E2 | 37.5 | 185 |
| E3 | 37 | 190 |
| E4 | 35.8 | 110 |
| E5 | 36 | 125 |
| E6 | 41 | 163 |
| E7 | 34.6 | 127 |
| E8 | 39 | 137 |
| E9 | 37 | 166 |
| E10 | 39 | 220 |
| CE1 | 50 | 380 |
| CE2 | 50 | 250 |

As indicated in the above Tables 1 and 2, the Pb-free solder alloy according to Examples of the present disclosure has both smaller wetting angle and smaller crack length. Therefore, it can be concluded that, the Pb-free solder alloy according to Examples of the present disclosure may have better stability and soldering performances.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A Pb-free solder alloy comprising:
greater than 5 wt% and up to 12 wt% of Zn,
0.5-4 wt% of Bi,
0.5-5 wt% of In,
0.04-0.5 wt% of P,
greater than 0.3 wt% and up to 0.5 wt% of Zr,
at least one selected from a group consisting of: 0-0.1 wt% of Y, 0-0.2 wt% of Ge, 0-0.05 wt% of Mg, 0-0.02 wt% of B, 0-0.05 wt% of Al, 0-0.2 wt% of Ni and 0-0.3 wt% of Ag, and
a balance of Sn.

2. A Pb-free solder alloy comprising:
greater than 5 wt% and up to 12 wt% of Zn,
0.5-4 wt% of Bi,
0.5-5 wt% of In,
0.005-0.5 wt% of P,
greater than 0.3 wt% and up to 0.5 wt% of Zr,
at least one selected from a group consisting of: 0-0.1 wt% of Y, 0-0.2 wt% of Ge, 0-0.05 wt% of Mg, 0-0.02 wt% of B, 0-0.05 wt% of Al, 0-0.2 wt% of Ni and 0-0.3 wt% of Ag, and
a balance of Sn.

* * * * *